（12） United States Patent
Zeng et al.

(10) Patent No.: US 11,581,610 B2
(45) Date of Patent: Feb. 14, 2023

(54) BATTERY BOX, BATTERY CELL, BATTERY, AND METHOD AND APPARATUS FOR PREPARING BATTERY BOX

(71) Applicant: CONTEMPORARY AMPEREX TECHNOLOGY CO., LIMITED, Fujian (CN)

(72) Inventors: Yuqun Zeng, Fujian (CN); Jianxiong Yang, Fujian (CN); Peng Wang, Fujian (CN); Zhijun Guo, Fujian (CN); Quankun Li, Fujian (CN); Zhanyu Sun, Fujian (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 88 days.

(21) Appl. No.: 17/113,010

(22) Filed: Dec. 5, 2020

(65) Prior Publication Data

US 2022/0013848 A1 Jan. 13, 2022

Related U.S. Application Data

(63) Continuation of application No. PCT/CN2020/101446, filed on Jul. 10, 2020.

(51) Int. Cl.
H01M 50/30 (2021.01)
H01M 10/42 (2006.01)
(Continued)

(52) U.S. Cl.
CPC ....... *H01M 50/30* (2021.01); *H01M 10/4207* (2013.01); *H01M 10/613* (2015.04);
(Continued)

(58) Field of Classification Search
CPC ............ H01M 10/613; H01M 10/647; H01M 10/4207; H01M 10/0525
See application file for complete search history.

(56) References Cited

U.S. PATENT DOCUMENTS

2012/0282503 A1* 11/2012 Fujikawa ............ H01M 50/213
429/82
2019/0237729 A1* 8/2019 Lee ........................ H01M 50/10

FOREIGN PATENT DOCUMENTS

CN 205846021 U * 12/2016
CN 205846021 U 12/2016
(Continued)

*Primary Examiner* — Jimmy Vo
(74) *Attorney, Agent, or Firm* — Scully Scott Murphy & Presser

(57) ABSTRACT

Disclosed are a battery box, a battery cell, a battery, and a method and apparatus for preparing the battery box. The battery box includes a pressure relief region including a first recess arranged at an inner surface of the battery box and a second recess arranged at an outer surface of the battery box, the first recess being arranged opposite to the second recess, wherein a third recess is provided at a bottom wall of the first recess and/or a bottom wall of the second recess, and the pressure relief region is configured to fracture at the third recess, when an internal pressure of the battery box reaches a threshold, to relieve the internal pressure. According to the battery box, the battery cell, the battery, and the method and apparatus for preparing the battery box disclosed in the present application, the pressure relief region is easy to machine.

18 Claims, 6 Drawing Sheets

(51) Int. Cl.
    *H01M 10/613*     (2014.01)
    *H01M 50/249*     (2021.01)
    *H01M 50/271*     (2021.01)
    *H01M 10/647*     (2014.01)
    *H01M 10/0525*     (2010.01)

(52) U.S. Cl.
    CPC ....... *H01M 10/647* (2015.04); *H01M 50/249* (2021.01); *H01M 50/271* (2021.01); *H01M 10/0525* (2013.01)

(56) References Cited

FOREIGN PATENT DOCUMENTS

| | | | | |
|---|---|---|---|---|
| CN | 209401662 U | 9/2019 | | |
| JP | 2004111155 A | 4/2004 | | |
| JP | 2008251438 A | 10/2008 | | |
| JP | 2013206814 A | 10/2013 | | |
| WO | WO-2012160907 A1 * | 11/2012 | .............. | H01M 2/08 |
| WO | WO-2014203344 A1 * | 12/2014 | ............ | H01M 2/024 |

\* cited by examiner

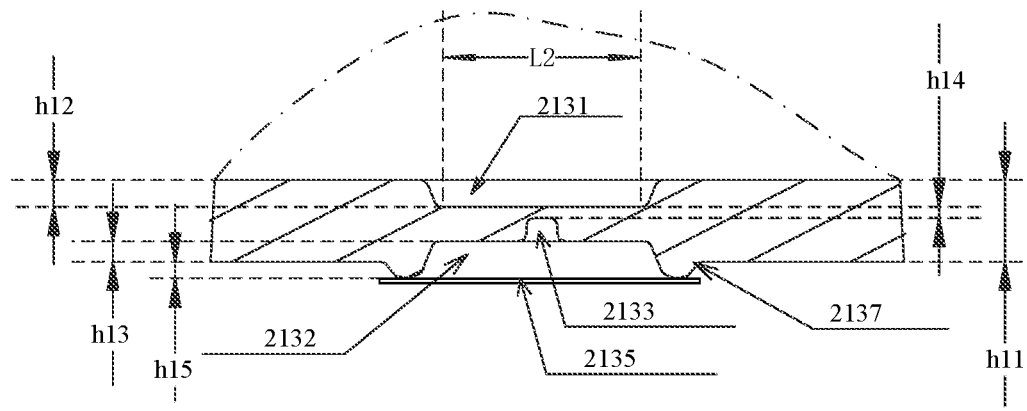

| Provide a first recess in an inner surface of a battery box, and provide a second recess in an outer surface of the battery box, so as to form a pressure relief region of the battery box, wherein the first recess is arranged opposite to the second recess | S210 |

| Provide a third recess in a bottom wall of the first recess and/or in a bottom wall of the second recess, the pressure relief region being configured to fracture at the third recess, when an internal pressure of the battery box reaches a threshold, to relieve the internal pressure | S220 |

Fig.13

Apparatus 300
Arrangement module 310

Fig.14

BATTERY BOX, BATTERY CELL, BATTERY, AND METHOD AND APPARATUS FOR PREPARING BATTERY BOX

CROSS-REFERENCE TO RELATED APPLICATIONS

This application is a continuation of International Application No. PCT/CN2020/101446, filed on Jul. 10, 2020, which is hereby incorporated by reference in its entirety.

TECHNICAL FIELD

The present application relates to the field of energy storage components and parts, and in particular to a battery box, a battery cell, a battery, and a method and apparatus for preparing the battery box.

BACKGROUND

Lithium-ion battery have the advantages of small size, high energy density, long cycle life, long storage time, etc., and are widely applied in some fields of electronic devices, electric vehicles, electric toys, etc., for example, applied to mobile phones, laptops, electric bicycles, electric vehicles, electric airplanes, electric ships, electric toy cars, electric toy ships, electric toy airplanes, electric tools, etc.

With the continuous development of the lithium-ion battery technology, higher requirements are put forward for the safety performance of lithium-ion batteries. A pressure relief mechanism on a lithium-ion battery has an important influence on the safety performance of the lithium-ion battery. For example, when the lithium-ion battery is short-circuited, overcharged, etc., the thermal runaway may occur inside the lithium-ion battery to cause sudden rise of the internal gas pressure, and at this time, a pressure relief mechanism needs to be actuated to release the internal gas pressure to the outside so as to prevent explosion of the lithium-ion battery. Therefore, the design of the pressure relief mechanism is extremely important.

SUMMARY

The present application proposes a battery box, a battery cell, a battery, and a method and apparatus for preparing the battery box, to improve the performance of the battery.

According to a first aspect of the present application, a battery box is provided, including a pressure relief region including a first recess arranged at an inner surface of the battery box and a second recess arranged at an outer surface of the battery box, the first recess being arranged opposite to the second recess, wherein a third recess is provided at a bottom wall of the first recess and/or a bottom wall of the second recess, and the pressure relief region is configured to fracture at the third recess, when an internal pressure of the battery box reaches a threshold, to relieve the internal pressure.

The battery box according to the embodiments of the present application is provided with a pressure relief region. The pressure relief region includes a first recess and a second recess respectively arranged in inner and outer surfaces of the battery box, and a third recess may be further provided in the bottom wall of the first recess and/or the bottom wall of the second recess, such that the third recess in the pressure relief region is thinner than other regions of the battery box. As such, when thermal runaway occurs inside the battery cell, the battery box can fracture at the relatively weak third recess to release the internal pressure. Also, as compared to the method in which the battery box is additionally installed with a pressure relief mechanism, the pressure relief region in the embodiments of the present application has a simpler machining process. For example, a first recess, a second recess and a third recess may be arranged by means of stamping, in which the first recess is arranged opposite to the second recess, and specifically, by means of opposite stamping to simultaneously machine two recesses, such that the machining process is convenient and efficient. Moreover, the dimension, the shape, etc. of the three recesses are flexibly set and can be adjusted according to the practical applications.

In some embodiments, the third recess is arranged at the bottom wall of the second recess.

Considering that the first recess is arranged in the inner surface of the battery box, if the third recess is arranged in the bottom wall of the first recess, since there is an electrolytic solution in the battery box and the electrolytic solution will be accumulated in the third recess and corrode the part of the third recess, the pressure relief region possibly fractures at the third recess early. Therefore, the third recess is generally arranged in the bottom wall of the second recess located in the outer surface so as to avoid the corrosion by the electrolytic solution.

In some embodiments, the thickness of the pressure relief region at the third recess is 0.16 mm to 0.25 mm.

In some embodiments, the axis perpendicular to the bottom wall of the first recess is the same as the axis perpendicular to the bottom wall of the second recess.

That is, the first recess is arranged directly opposite to the second recess, such that a structure of the pressure relief region may be relatively symmetrical, which is conducive to more accurate directional fracturing of the pressure relief region.

In some embodiments, a protrusion is provided on the outer surface of the battery box and surrounds the second recess.

Considering that if the first recess and the second recess are machined by means of stamping, there will generally be a protrusion at the edge of the recess. If the protrusion is arranged in the interior, the installation of the internal electrode assembly will be affected. Therefore, the protrusion may be arranged on the outer surface of the housing.

In some embodiments, the protruding height of the protrusion relative to the outer surface of the battery box is 0.25 mm to 1 mm.

In some embodiments, the shape of the bottom wall of the first recess and/or the bottom wall of the second recess is a long-strip shape.

The long-strip-shaped recesses are easier to machine.

In some embodiments, the width of the bottom wall of the first recess and/or the bottom wall of the second recess is 3 mm to 6 mm.

In some embodiments, the area of the bottom wall of the first recess is 150 mm$^2$ to 330 mm$^2$; and/or the area of the bottom wall of the second recess is 150 mm$^2$ to 330 mm$^2$.

In some embodiments, the depth of the first recess relative to the inner surface of the battery box is 0.4 mm to 0.7 mm; and/or the depth of the second recess relative to the outer surface of the battery box is 0.3 mm to 0.6 mm.

In some embodiments, the shape of the bottom wall of the third recess is a long-strip shape.

In some embodiments, the length of the third recess is 40 mm to 100 mm.

In some embodiments, the first recess and/or the second recess are/is a ring recess.

In some embodiments, the area of the bottom wall of the first recess is 400 mm² to 1000 mm²; and/or the area of the bottom wall of the second recess is 600 mm² to 1200 mm².

In some embodiments, the depth of the first recess relative to the inner surface of the battery box is 1 mm to 2 mm; and/or the depth of the second recess relative to the outer surface of the battery box is 0.3 mm to 0.6 mm.

In some embodiments, the bottom wall of the second recess is provided with a ring-shaped fourth recess, and the third recess is arranged at the bottom wall of the fourth recess.

In order to make the pressure relief region easier to fracture when thermal runaway occurs inside the battery cell, the thickness of the third recess should be thinner, such that fracturing can occur at the third recess in the pressure relief region so as to achieve more accurate directional fracturing for gas discharge. A fourth recess is provided in the second recess, and then a third recess is provided in the bottom wall of the fourth recess. As such, a thinner third recess region can be obtained more easily.

In some embodiments, the area of the bottom wall of the fourth recess is 200 mm² to 800 mm².

In some embodiments, the battery box further includes: a protective sheet, which is configured to protect the pressure relief region, is arranged on the outer surface of the battery box, and covers the second recess.

In some embodiments, the thickness of the protective sheet is 0.1 mm to 0.2 mm.

The protective sheet arranged on the side, away from the interior of the battery box, of the pressure relief region can protect the pressure relief region from being affected by the external components.

The pressure relief region in the embodiments of the present application is formed by recesses, so when the protective sheet is arranged on the outer surface of the battery box and covers the second recess, there is a gap between the protective sheet and the pressure relief region. As such, when gas discharge occurs at the pressure relief region, the gap between the protective sheet and the pressure relief region can ensure that the pressure relief region has a certain open space, and can also prevent the protective sheet, when being attached to the pressure relief region, from causing wear in the pressure relief area, thereby further protecting the pressure relief region.

In some embodiments, the battery box includes: a housing, which is a hollow cuboid and has an opening at one end; and a cover plate covering the opening of the housing.

In some embodiments, the pressure relief region is located at the bottom wall of the housing, and the bottom wall of the housing is a wall opposite the opening of the housing.

Considering that the electrode terminals are generally arranged on the cover plate of the battery box, if the pressure relief region is also arranged on the cover plate, when thermal runaway occurs inside the battery cell, the pressure relief region fractures, a liquid or solid combustible material, which may also contain a conductive material, will be sprayed out while the internal gas pressure of the battery cell is released, resulting in short circuit between the electrode terminals. Moreover, considering that the electrode terminals are generally directed upward, that is, toward a passenger, when the battery is installed in a vehicle, if the pressure relief region is installed on the same side as the electrode terminals, gas flow and other materials released after the pressure relief region fractures will be discharged upward, which may cause burn or scald of the passenger, increasing the risk of the passenger. Therefore, when the pressure relief region is arranged at the bottom wall of the housing, the pressure relief region discharges gas downward, which may avoid the problems mentioned above.

In some embodiments, the thickness of the bottom wall of the housing is 1.2 mm to 2 mm.

In some embodiments, the battery box further includes: electrode terminals including a positive electrode terminal and a negative electrode terminal both arranged on the cover plate.

According to a second aspect of the present application, a battery cell is provided, including: the battery box as described in the first aspect mentioned above and any one of possible implementations of the first aspect; and an electrode assembly arranged in the battery box.

In some embodiments, the battery box includes: a housing, which is a hollow cuboid and has an opening at one end; and a cover plate covering the opening of the housing.

In some embodiments, the battery cell further includes: a backing plate being located between the electrode assembly and the bottom wall of the housing, and the bottom wall of the housing being a wall of the housing opposite to the opening of the housing.

The backing plate can also protect the pressure relief region to avoid the impact of the electrode assembly and the electrolytic liquid inside the battery box onto the pressure relief region.

In some embodiments, the pressure relief region is located at the bottom wall of the housing, and the backing plate is provided with a through hole corresponding to the pressure relief region such that the backing plate does not block the pressure relief region.

When the pressure relief region is located on the bottom wall, if the strength of the pressure relief region can ensure that the electrode assembly and the electrolytic liquid will not cause damage to the pressure relief region, when thermal runaway occurs inside the battery cell, considering that the backing plate may prevent the gas from rushing through the pressure relief region, so in order to make the pressure relief region easier to fracture, part of the backing plate may be removed to form an avoidance zone, for example, the backing plate can be correspondingly provided with a through hole at the position where the pressure relief region is located, such that the backing plate will not block the pressure relief region.

According to a third aspect of the present application, a battery is provided, including: a plurality of battery cells including at least one battery cell as described in the second aspect mentioned above and any one of possible implementations of the second aspect; a bus component for achieving electrical connection of the plurality of battery cells; and a case for accommodating the plurality of battery cells and the bus component.

According to a fourth aspect of the present application, a power consumption device is provided, including: the battery as described in the third aspect mentioned above.

The power consumption device may be a vehicle, a ship, or a spacecraft.

According to a fifth aspect of the present application, a method for preparing a battery box is provided, the method including: providing a first recess in an inner surface of the battery box, and providing a second recess in an outer surface of the battery box, so as to form a pressure relief region of the battery box, wherein the first recess is arranged opposite to the second recess; and providing a third recess in a bottom wall of the first recess and/or in a bottom wall of the second recess, the pressure relief region being configured to fracture at the third recess, when the internal pressure of the battery box reaches the threshold, to relieve the internal pressure.

In some embodiments, a protrusion is provided on the outer surface of the battery box and surrounds the second recess.

In some embodiments, the shape of the bottom wall of the first recess and/or the bottom wall of the third recess is a long-strip shape.

In some embodiments, the first recess and/or the second recess are/is a ring recess.

It should be understood that the method for preparing a battery box of the embodiments of the present application can be configured to prepare the battery box as described in the first aspect mentioned above and any one of the possible implementations of the first aspect.

According to a sixth aspect of the present application, an apparatus for preparing a battery box is provided, including: an arrangement module configured to: provide a first recess in an inner surface of the battery box, and provide a second recess in an outer surface of the battery box, so as to form a pressure relief region of the battery box, wherein the first recess is arranged opposite to the second recess; and provide a third recess in a bottom wall of the first recess and/or in a bottom wall of the second recess, the pressure relief region being configured to fracture at the third recess, when the internal pressure of the battery box reaches the threshold, to relieve the internal pressure.

In some embodiments, a protrusion is provided on the outer surface of the battery box and surrounds the second recess.

In some embodiments, the shape of the bottom wall of the first recess and/or the bottom wall of the third recess is a long-strip shape.

In some embodiments, the first recess and/or the second recess are/is a ring recess.

It should be understood that the apparatus for preparing a battery box according to the embodiments of the present application can be configured to perform the method as described in the fifth aspect mentioned above or any one of possible implementations of the fifth aspect. In particular, the apparatus includes a unit for performing the method as described in the fifth aspect mentioned above or any one of possible implementations of the fifth aspect.

BRIEF DESCRIPTION OF DRAWINGS

The accompanying drawings described herein are intended to provide a further understanding of the present application, which constitute a part of the present application. Illustrative embodiments of the present application and the description thereof are for explaining the present application and do not constitute an undue limitation of the present application. In the drawings:

FIG. 12 is an enlarged view of region A2 shown in FIG. 11;

FIG. 13 is a schematic flowchart of some embodiments of a method for preparing a battery box of the present application;

FIG. 14 is a schematic structural diagram of some embodiments of an apparatus for preparing a battery box of the present application.

DESCRIPTION OF EMBODIMENTS

Figure 1:
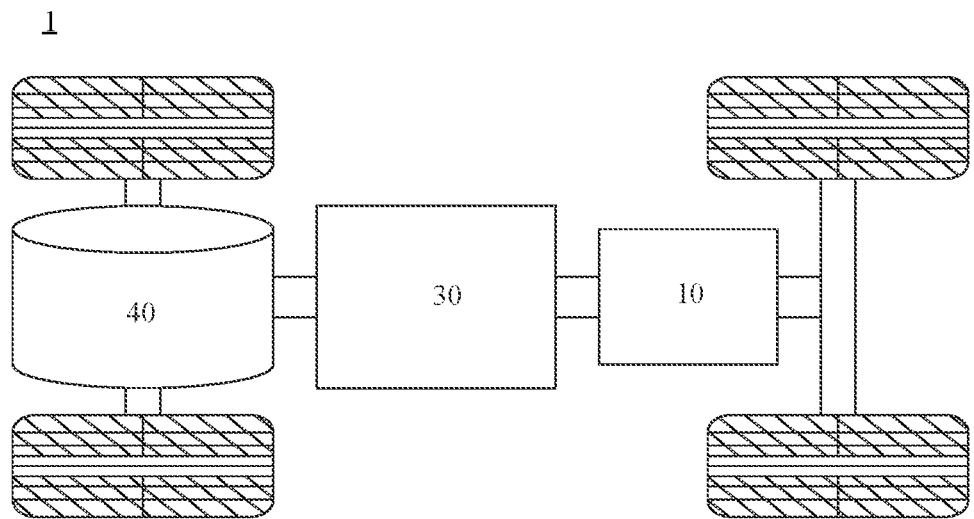
FIG. 1 is a schematic contour diagram of some embodiments of a vehicle using a battery of the present application.

In order to make objectives, technical solutions, and advantages of embodiments of the present application clearer, the technical solutions in embodiments of the present application will be clearly and completely described below with reference to the accompanying drawings in the embodiments of the present application. Obviously, the described embodiments are some of, rather than all of, the embodiments of the present application. All the other embodiments obtained by those of ordinary skill in the art based on the embodiments of the present application without any creative efforts shall fall within the scope of protection of the present application.

Unless otherwise defined, all technological and scientific terms used herein have the same meanings as those commonly understood by those skilled in the art to which the present application belongs. The terms used in the specification of the present application herein are merely for the purpose of describing specific embodiments, but are not intended to limit the present application. The terms "comprising" and "having" and any variations thereof in the specification and the claims of the present application as well as the brief description of the drawings described above are intended to cover non-exclusive inclusion. The terms "first", "second" or the like in the specification and the claims of the present application as well as the above drawings are used to distinguish different objects, rather than to describe a specific order or the primary-secondary relationship.

The phrase "embodiments" referred to herein means that the specific features, structures, and characteristics described in conjunction with the embodiments may be are included in at least one embodiment of the present application. The phrase at various locations in the specification does not necessarily refer to the same embodiment, or an independent or alternate embodiment exclusive of another embodiment. Those skilled in the art understand, in explicit and implicit manners, that an embodiment described herein may be combined with another embodiment.

The term "and/or" herein is merely a description of the associated relationship of associated objects, which indicates that there may be three relationships. For example, A and/or B may indicate three situations: A exists alone, both A and B exist, and B exists alone. In addition, the character "/" herein generally indicates that the associated previous and next objects are in the relationship of "or".

In the present application, "a plurality of" means two or more (including two), similarly, "a plurality of groups" means two or more groups (including two groups), and "a plurality of sheets" means two or more sheets (including two sheets).

The battery box, the battery cell, and the battery including a plurality of battery cells described in the embodiments of the present application are all applicable to various apparatuses using a battery, for example, mobile phones, portable devices, laptops, battery driven vehicles, electric vehicles, ships, spacecrafts, electric toys, and electric tools. For example, the spacecrafts include airplanes, rockets, space shuttles, space vehicles, etc.; the electric toys include fixed or movable electric toys, such as game consoles, electric vehicle toys, electric ship toys and electric airplane toys; and the electric tools include electric metal cutting tools, electric grinding tools, electric assembling tools and electric railway tools, such as electric drills, electric grinders, electric spanners, electric screwdrivers, electric hammers, electric impact drills, concrete vibrators and electric planers.

The battery box, the battery cell, and the battery including a plurality of battery cells described in the embodiments of the present application are not only applicable to the devices described above, but also applicable to all devices using a battery, but for brevity, the following embodiments are all described taking an electric vehicle as an example.

For example, as shown in FIG. 1, which is a schematic structural diagram of a vehicle 1 according to an embodiment of the present application, the vehicle 1 may be a fuel vehicle, a gas vehicle, or a new-energy vehicle. The new-energy vehicle may be a battery electric vehicle, a hybrid vehicle, an extended-range vehicle, etc. The vehicle 1 may be internally provided with a battery 10. The battery 10 may be a battery pack or a battery module. For example, the battery 10 may be arranged at the bottom or the head or the tail of the vehicle 1. The vehicle 1 may also be internally provided with a controller 30 and a motor 40. The battery 10 may be used for power supply to the vehicle 1. For example, the battery 10 may serve as an operation power source of the vehicle 1, and used for the circuitry of the vehicle 1, for example, for the working power demand of the vehicle 1 during the start-up, navigation and running. In another embodiment of the present application, the battery 10 can be used not only as an operation power source of the vehicle 1, but also as a driving power source of the vehicle 1 to provide driving power for the vehicle 1 instead of or partially instead of fuel or natural gas.

Figure 2:
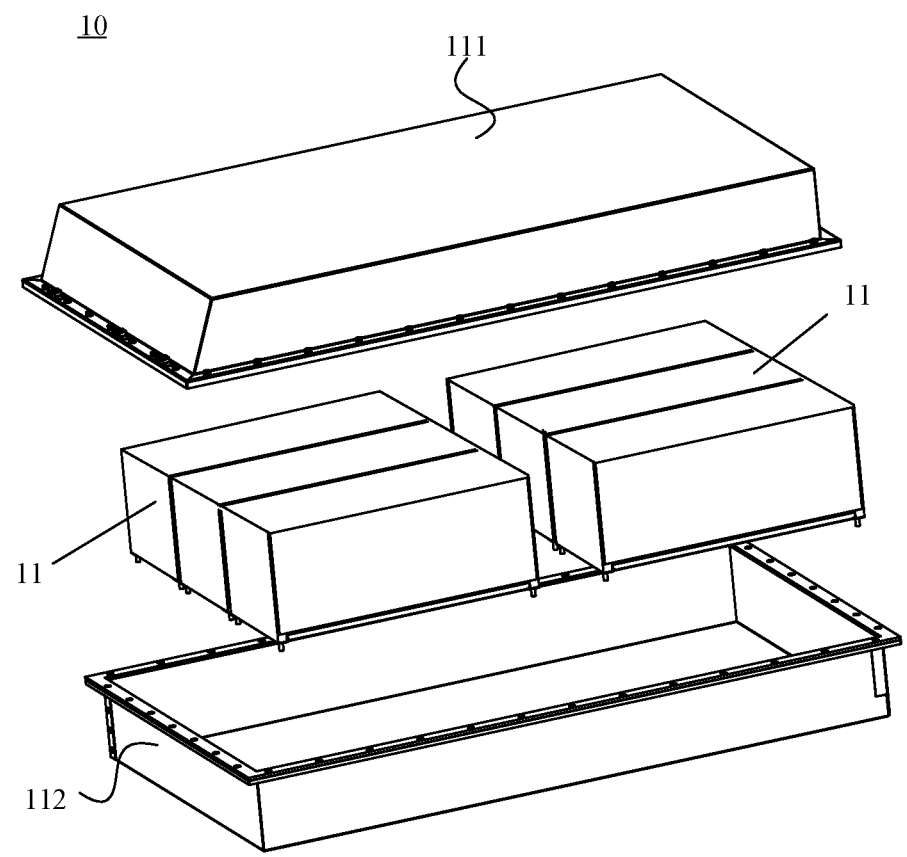
FIG. 2 is a schematic structural diagram of some embodiments of the battery of the present application.

In order to meet different power demands, the battery 10 may include one or more battery modules (or may also be referred to as battery units), wherein the plurality of battery modules may be in a series connection, or in a parallel connection, or in a series-parallel connection which refers to a mixed series and parallel connection. For example, as shown in FIG. 2, which is a schematic structural diagram of a battery 10 of another embodiment of the present application, the battery 10 includes a first cover 111, a second cover 112 and a plurality of battery modules 11, wherein the shapes of the first cover 111 and the second cover 112 may be determined according to the combined shape of the one or more battery modules 11. Each of the first cover 111 and the second cover 112 has an opening, for example, each of the first cover 111 and the second cover 112 may be a hollow cuboid and has only one face as an open face, that is, this face does not have a housing wall so as to cause communication between the inside and the outside of the housing, the first cover 111 and the second cover 112 are fastened to each other at the openings to form a closed shell of the battery 10, and the one or more battery modules 11 are in a parallel connection or in a series connection or in a series-parallel connection to each other and then are placed in the shell formed after the first cover 111 and the second cover 112 are fastened together.

In another embodiment of the present application, when the battery 10 includes one battery module 11, the battery module 11 is placed in the shell formed after the first cover 111 and the second cover 112 are fastened together.

The electric power generated by the one or more battery modules 11 is drawn out through the shell via an electrically conductive mechanism (not shown).

In addition, the battery 10 may further include other structures, which will not be described in detail herein. For example, the battery 10 may further include a bus component for achieving electrical connection among a plurality of battery cells (not shown). For another example, the battery 10 may further include a cooling component, which is used for holding a cooling medium to cool one or more battery modules 11, but the embodiments of the present application are not limited thereto.

Figure 3:
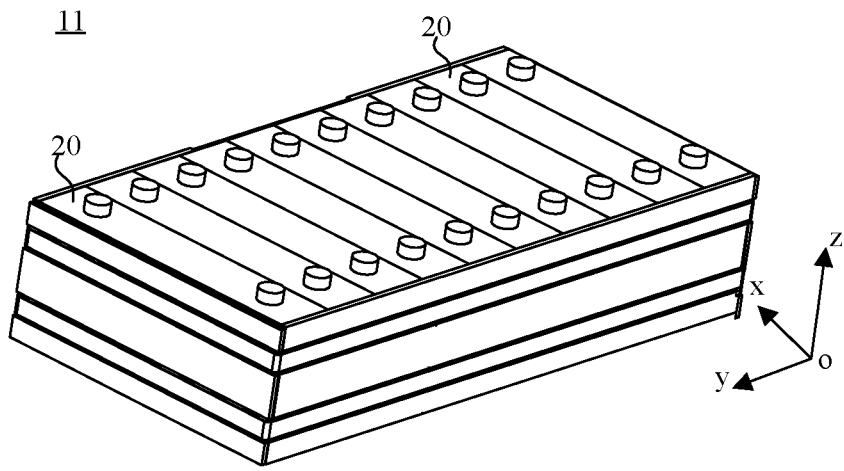
FIG. 3 is a schematic structural diagram of some embodiments of a battery module in the battery of the present application.

According to the different power demands, the battery module 11 may include one or more battery cells. For example, as shown in FIG. 3, one battery module 11 may include a plurality of battery cells 20, and the plurality of battery cells 20 may be in a series connection, in a parallel connection or in a parallel-series connection to achieve larger capacity or power. Moreover, the number of the battery cells 20 included in one battery module 11 may be set to any value. Each battery cell 20 may include a lithium-ion secondary battery, a lithium-ion primary battery, a lithium sulfur battery, a sodium lithium-ion battery, or a magnesium-ion battery, but is not limited thereto. The battery cell 20 may be a cylinder, a flat body, or a cuboid, or in other shapes.

In another embodiment of the present application, a plurality of battery cells 20 may be stacked together, and the plurality of battery cells 20 are in a series connection, in a parallel connection or in a parallel-series connection. In another embodiment of the present application, each battery cell 20 may be square, cylindrical or in other shapes.

Each battery cell 20 may include a battery box and an electrode assembly arranged in the battery box, wherein the battery box may include a housing and a cover plate, the housing may be a hollow cuboid or cube or cylinder, and one of faces of the housing has an opening such that the electrode assembly can be placed into the housing; and the cover plate is connected to the housing at the opening of the housing to form a closed battery box of the battery cell 20, and the housing may be filled with an electrolytic solution.

In addition, the battery box further includes two electrode terminals, which are generally arranged on the cover plate and are connected to the electrode assembly; and the flat plate face of the cover plate may further be provided with a pressure relief mechanism, which may be part of the flat plate face of the cover plate or may be welded to the flat plate face of the cover plate. In a normal state, the pressure relief mechanism is hermetically combined with the cover plate, that is, the cover plate is connected to the housing at the opening of the housing to form the battery box of the battery cell 20, and the space formed by the battery box is hermetically sealed. When too much gas is generated by the battery cell 20, the gas expands such that the gas pressure in the battery box increases to exceed a preset value, the pressure relief mechanism can be fractured to cause communication between the inside and the outside of the battery box, and the gas is released to the outside through the fracture of the pressure relief mechanism, thereby avoiding explosion.

In an existing battery cell, a pressure relief mechanism is generally arranged on a cover plate and is located on the same side as an electrode terminal, such that when thermal runaway occurs inside the battery cell, the pressure relief mechanism is fractured, and a liquid or solid combustible material, which may also contain a conductive material, will be sprayed out while the internal gas pressure of the battery cell is released, resulting in short circuit between the electrode terminals. Moreover, considering that the electrode terminals are generally directed upward, that is, toward a passenger, when the battery is installed in a vehicle, if the pressure relief mechanism is installed on the same side as the electrode terminals, gas flow and other materials released after the pressure relief mechanism is fractured will be discharged upward, which may cause burn or scald of the passenger, increasing the risk of the passenger. Therefore, it can be conceived that the pressure relief mechanism is installed at other positions, for example, installed on the housing below the cover plate, such as installed on the bottom wall of the housing, so as to solve the problems mentioned above.

However, if the pressure relief mechanism is installed on the housing, since the housing has a hollow structure with an opening at one end, and the pressure relief mechanism is generally sheet-shaped, it may be inconvenient to install the pressure relief mechanism on the housing, especially when the pressure relief mechanism is installed on the bottom wall of the housing. Due to the limitation of the depth of the housing, it is difficult to directly weld the sheet-shaped pressure relief mechanism to the bottom wall. Therefore, the embodiments of the present application provide a battery box with a pressure relief region, which can solve the problems mentioned above.

Figure 4:
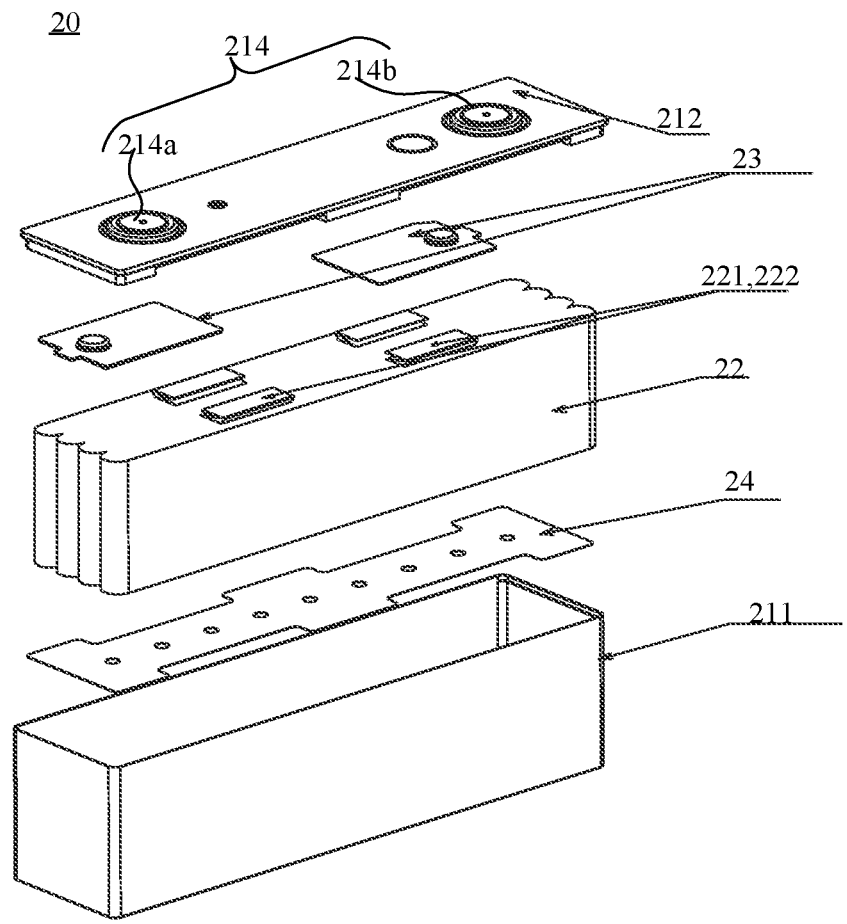
FIG. 4 is an exploded view of some embodiments of a battery cell of the present application.

Specifically, still taking the embodiments shown in FIGS. 1-3 as examples, FIG. 4 shows another embodiment of the battery cell 20 of the embodiments of the present application. As shown in FIG. 4, the battery cell 20 includes a battery box (not shown), one or more electrode assemblies 22, and a connecting member 23, wherein the battery box in the embodiments of the present application includes a housing 211 and a cover plate 212.

Specifically, as shown in FIG. 4, the shape of the housing 211 included in the battery box of the battery cell 20 may be determined according to the shape of the one or more electrode assemblies 22 after being combined, for example, the housing 211 may be a hollow cuboid or cube or cylinder, and one of faces of the housing 211 has an opening such that the one or more electrode assemblies 22 can be placed in the housing 211. For example, when the housing 211 is a hollow cuboid or cube, one of the flat faces of the housing 211 is an open face, that is, the flat face does not have a housing wall so as to cause communication between the inside and the outside of the housing 211, and when the housing 211 may be a hollow cylinder, the circular side face of the housing 211 is an open face, that is, the circular side face does not have a housing wall so as to cause communication between the inside and the outside of the housing 211. The cover plate 212 is connected to the housing 211 at the opening of the housing 211 to form a closed battery box, and the housing 211 is filled with the electrolytic solution.

As shown in FIG. 4, the battery box of the battery cell 20 may further include two electrode terminals 214, and the two electrode terminals 214 may be arranged on the cover plate 212. The cover plate 212 is generally in the shape of a flat plate, and the two electrode terminals 214 are located on the flat plate face of the cover plate 212 and penetrates the flat plate face of the cover plate 212. The two electrode terminals 214 are respectively a positive electrode terminal 214a and a negative electrode terminal 214b, and the electrode terminals 214 are each provided with a connecting member 23, which is also referred to as a current collecting member 23, or a copper-aluminum adapter plate 23, which is located between the cover plate 212 and the electrode assembly 22.

As shown in FIG. 4, each electrode assembly 22 may specifically include at least one positive electrode tab 221 and at least one negative electrode tab 222. In addition, the electrode assembly 22 may further include a bare cell and an insulation sheet wrapping the bare cell, with the specific positions of the positive electrode tab 221 and the negative electrode tab 222 being not distinguished in FIG. 4. The positive electrode tab 221 of the one or more electrode assemblies 22 is connected to one electrode terminal via a connecting member 23, and the negative electrode tab 222 of the one or more electrode assemblies 22 is connected to another electrode terminal via another connecting member 23. For example, the positive electrode terminal 214a is connected to the positive electrode tab 221 via a connecting member 23, and the negative electrode terminal 214b is connected to the negative electrode tab 222 via another connecting member 23.

In the battery cell 20, according to the practical requirements, single or multiple electrode assemblies 22 may be provided. As shown in FIG. 4, at least two independent electrode assemblies 22 are provided in the battery cell 20.

In this battery cell 20, the electrode assembly 22 may have a winding structure or may have a laminated structure, and the embodiments of the present application are not limited thereto.

In addition, as shown in FIG. 4, the battery cell 20 may also include a backing plate 24. The backing plate 24 is located between the electrode assembly 22 and the bottom wall of the housing 211, may support the electrode assembly 22, and may also effectively prevent the electrode assembly 22 from interfering with round corners around the bottom wall of the housing 211. The shape of the backing plate 24 in the embodiment of the present application may be arranged according to the practical application. For example, the backing plate 24 may be arranged in a rectangular shape consistent with the shape of the bottom wall of the housing 211 or, as shown in FIG. 4, may also be arranged in other shapes. In addition, the backing plate 24 may be provided with one or more through holes, for example, may be provided with a plurality of through holes arranged uniformly or symmetrically so as to cause communication between the spaces of upper and lower surfaces of the backing plate 24, such that the gas, generated inside the electrolytic solution and the electrode assembly 22, and the electrolytic solution can freely pass through the backing plate 24 to facilitate guiding of liquid and gas.

The backing plate 24 has a thickness generally set to be 0.3-5 mm, is preferably an insulation component, but may also not be insulated. For example, the material of the backing plate 24 may be PP, PE, PET, PPS, Teflon, stainless steel, aluminum, and other materials that are resistant to electrolytic solutions and are insulating, wherein the plastic material, such as PP, PE, PET or PPS, may be a fireproof material, and the surface of the metal material, such as aluminum or stainless steel, may be anodized for insulation.

In addition, the battery cell 20 in the embodiments of the present application may also include other components. For example, the battery cell 20 may further include at least one of a top cover patch, a sealing nail, and a plastic nail, wherein the top cover patch, the sealing nail and the plastic nail may be installed on the cover plate 212. In addition, the battery cell 20 may also include a blue film, which is arranged on the outer surface of the battery housing 211 to achieve the effects of insulation and protecting the battery cell. However, the embodiments of the present application are not limited thereto.

Figure 5:
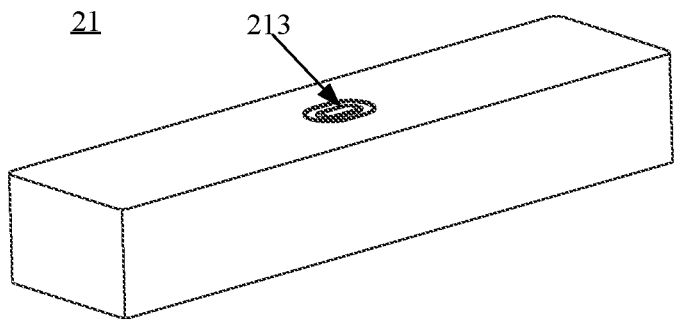
FIG. 5 is a schematic diagram of some embodiments of the battery box with a pressure relief region of the present application.
Figure 6:
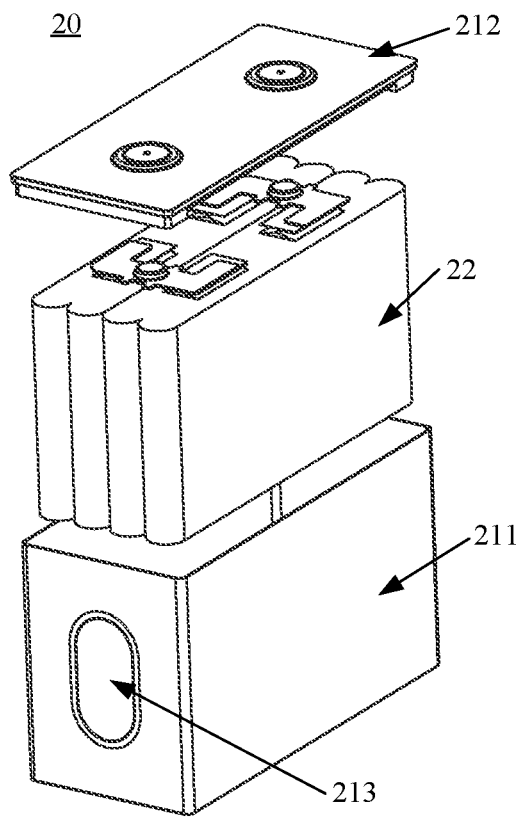
FIG. 6 is an exploded view of other embodiments of the battery cell of the present application.

In the embodiments of the present application, the housing 211 or the cover plate 212 of the battery box may also be provided with a pressure relief region. For example, the bottom wall of the housing 211 in FIG. 4 may be provided with the pressure relief region. Specifically, taking FIG. 5 as an example, FIG. 5 shows a schematic diagram of the battery box 21. In the embodiments of the present application, the battery box 21 in FIG. 5 includes a housing 211 and a cover plate 212, as shown in FIG. 4. As shown in FIG. 5, a cuboid (i.e., hexahedral) battery box 21 is taken as an example for description here. The battery box 21 includes six walls (or six surfaces), FIG. 5 shows any three adjacent walls of the battery box 21, and the pressure relief region 213 in the embodiments of the present application may be arranged on any wall of the battery box 21. For example, the pressure relief region 213 may be arranged at the bottom wall of the housing 211 of the battery box 21, and the bottom wall of the housing 211 is opposite the opening of the housing 211. That is, in FIG. 5, the wall, provided with the pressure relief region 213, of the battery box 21 is the bottom wall of the housing 211. For another example, as shown in FIG. 6, the pressure relief region 213 may also be arranged at any side wall of the housing 211, but the embodiments of the present application are not limited thereto. The pressure relief region 213 in the embodiments of the present application is used to be actuated, when the internal pressure of the battery box 21 reaches the threshold, to relieve the internal pressure.

In the embodiments of the present application, the battery box 21 is a cuboid, and the housing 211 has four side walls, including two side walls with a larger area and two side walls with a smaller area. In the case where the pressure relief region 213 is arranged at the side walls of the housing 211, the pressure relief region 213 is generally arranged on the side walls with a smaller area, for example, as shown in FIG. 6. Considering that when a plurality of battery cells are assembled into a battery, for example, as the installation method as shown in FIG. 3, for cuboid battery cells, two adjacent battery cells are generally placed such that the walls with a larger area in the side walls of the housings in the two battery cells come into contact with each other. Therefore, if the pressure relief region 213 is arranged on the side wall with a larger area, when a plurality of battery cells are tightly arranged to be assembled into a battery, it is affected to open the pressure relief region 213, for example, it is necessary to leave a space between the battery cells for the pressure relief region 213 to open, which is not conducive to the installation of the plurality of battery cells. Therefore, installing the pressure relief region 213 on the side walls with a smaller area is conductive to the placement of the plurality of battery cells and further increases the energy density of the battery.

In the case where the pressure relief region 213 is arranged at the bottom wall of the housing 211, considering the pressure of the internal electrode assembly 22 on the pressure relief region 213, for example, for a battery installed inside a vehicle, the vehicle bumps during the travel, the electrode assembly 22 and the electrolytic solution will impact the side walls and the bottom wall of the housing 211, and the pressure relief region 213 is thinner than other regions of the bottom wall of the housing.

Therefore, as shown in FIG. 4, providing the backing plate 24 between the electrode assembly 22 and the bottom wall of the housing 211 may have a cushioning effect on the pressure relief region 213 underneath so as to prevent the electrolytic solution and the electrode assembly 22 from impacting the pressure relief region 213 to cause the pressure relief region 213 to fracture during the vibration and impact.

However, on the other hand, the backing plate 24 on the bottom wall covers the pressure relief region 213 to protect the pressure relief region 213 and, at the same time, may also cause the backing plate 24 to prevent the gas from rushing through the pressure relief region 213. Therefore, the backing plate 24 may also be provided with an avoidance zone to ensure that the backing plate does not block the pressure relief region 213. That is, it is possible to choose whether to provide an avoidance zone on the backing plate 24 according to the factors, such as the thickness and the strength, of the pressure relief region 213 in practical applications.

Figure 7:
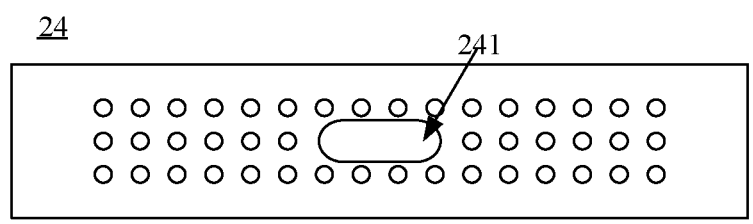
FIG. 7 is a schematic diagram of some embodiments of a backing plate of the present application.

Specifically, in the case where the backing plate 24 is provided with an avoidance zone to ensure that the backing plate does not block the pressure relief region 213, as shown in FIG. 7, a cuboid backing plate 24 is taken as an example for description here, part of the region of the backing plate 24 may be removed, that is, at the position where the pressure relief region 213 is located, the backing plate 24 is correspondingly provided with a through hole as the avoidance zone 241, such that the backing plate 24 does not block the pressure relief region. The shape of the avoidance zone 241 on the backing plate 24 is generally consistent with the shape of the surface of the side, close to the interior of the housing 211, of the pressure relief region 213. FIG. 7 is only an example, and the embodiments of the present application are not limited thereto.

Moreover, in order to make the backing plate 24 not block the pressure relief region 213 at all, the area of the avoidance zone 241 of the backing plate 24 is generally set to be larger than the area of the pressure relief region 213. Alternatively, considering that the pressure relief region 213 in the embodiments of the present application is arranged in the through hole of the bottom wall of the housing 211, the area of the avoidance zone 241 of the backing plate 24 is larger than the area of the through hole of the bottom wall of the housing 211, but the embodiments of the present application are not limited thereto.

Figure 8:
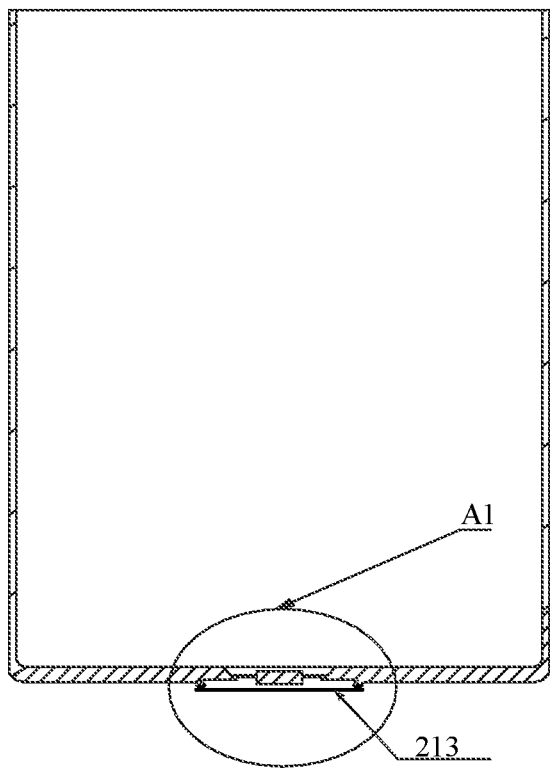
FIG. 8 is a cross-sectional view of some embodiments of a housing of the battery box of the present application.
Figure 9:
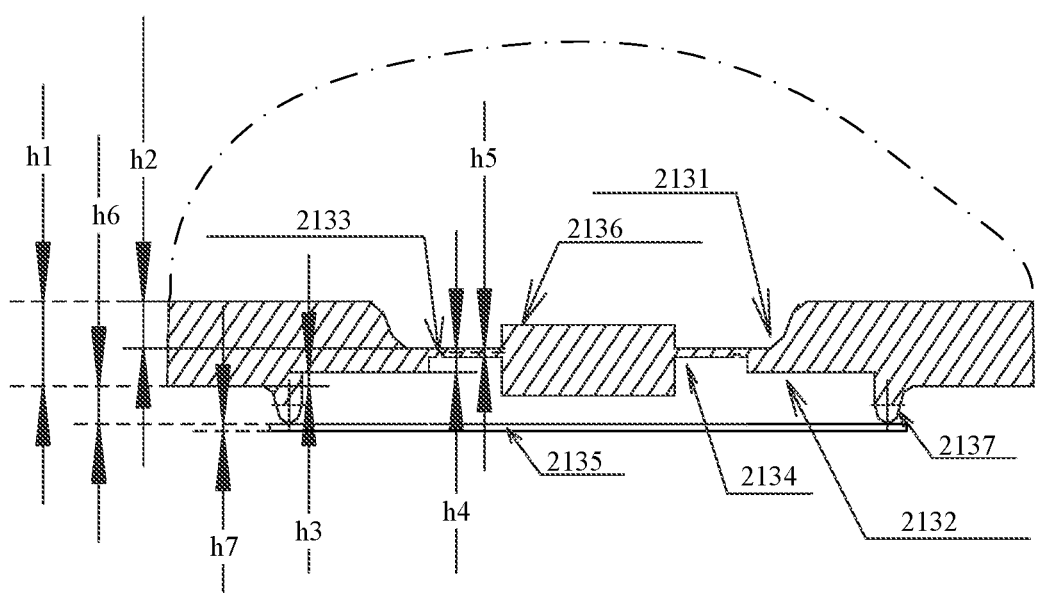
FIG. 9 is an enlarged view of a region A1 shown in FIG. 8.

The pressure relief region 213 in the embodiments of the present application will be described in detail below in conjunction with the accompanying drawings. Specifically, the case where the pressure relief region 213 is arranged on the bottom wall of the housing 211 is taken as an example. FIG. 8 shows a cross-sectional view of the housing 211 in the embodiments of the present application. For example, the surface shown in the cross-sectional view may be a surface that passes through the pressure relief region 213 and is parallel to the side walls with a smaller area of the housing 211. FIG. 9 is an enlarged view of the region A1 in FIG. 8. The region A1 includes a pressure relief region 213, in which the upper part in FIG. 9 corresponds to the interior of the housing 211, and the lower part in FIG. 9 corresponds to the exterior of the housing 211. Specifically, as shown in FIG. 9, the pressure relief region 213 in the embodiments of the present application may include a first recess 2131 provided in an inner surface of the housing 211 of the battery box 21 and a second recess 2132 provided in an outer surface of the housing 211 of the battery box 21, the first recess 2131 being arranged opposite to the second recess 2132, wherein a third recess 2133 is provided at a bottom wall of the first recess 2131 and/or a bottom wall of the second recess 2132, and the pressure relief region 213 is configured to fracture at the third recess 2133, when the internal pressure of the battery box 21 reaches the threshold, to relieve an internal pressure.

As such, when thermal runaway occurs inside the battery cell, the battery box 21 may fracture at the relatively weak third recess 2133 to release the internal pressure. Also, as compared to the method in which the battery box 21 is additionally installed with a pressure relief mechanism, the pressure relief region 213 in the embodiments of the present application has a simpler machining process. For example, a first recess 2131, a second recess 2132 and a third recess 2133 may be arranged by means of stamping, wherein the first recess 2131 is arranged opposite to the second recess 2132, specifically, by means of opposite stamping to simultaneously machine two recesses, such that the machining process is convenient and efficient. Moreover, the dimension, the shape, etc. of the three recesses are flexibly set, and can be adjusted according to the practical applications. Moreover, the material used for the housing 211 is generally metallic aluminum, so the material of the pressure relief region 213 is also aluminum. As compared to the additionally provided pressure relief mechanism made of another material, the pressure relief region 213 in the embodiments of the present application is easier to machine, and is also easy to open in time when thermal runaway occurs inside the battery box 21, such that the gas discharge is smoother and the gas discharge rate is high.

In addition, considering that the electrode terminals 214 are generally arranged on the cover plate 212 of the battery box 21, if the pressure relief region 213 is also arranged on the cover plate 212, when thermal runaway occurs inside the battery cell 20, the pressure relief region 213 fractures, a liquid or solid combustible material, which may also contain a conductive material, will be sprayed out while the internal gas pressure of the battery cell 20 is released, resulting in short circuit between the electrode terminals 214. Moreover, considering that the electrode terminals 214 are generally directed upward, that is, toward a passenger, when the battery is installed in a vehicle, if the pressure relief region 213 is installed on the same side as the electrode terminals 214, gas flow and other materials released after the pressure relief region 213 fractures will be discharged upward, which may cause burn or scald of the passenger, increasing the risk of the passenger. Therefore, it is possible to make a flexible choice that the pressure relief region 213 in the embodiment of the present application is arranged on the bottom wall or on the side wall of the housing 211 of the battery box 21, which will not be limited by the machining methods.

In the embodiments of the present application, the third recess 2133 may be arranged in the bottom wall of the first recess 2131 and/or in the bottom wall of the second recess 2132. However, considering that the first recess 2131 is arranged in the inner surface of the battery box 21, if the third recess 2133 is arranged in the bottom wall of the first recess 2131, since there is an electrolytic solution in the battery box 21 and the electrolytic solution will be accumulated in the third recess 2133 and corrode the part of the third recess 2133, the pressure relief region 213 possibly fractures at the third recess 2133 early. Therefore, the third recess 2133 is generally arranged in the bottom wall of the second recess 2132 located in the outer surface so as to avoid the corrosion by the electrolytic solution. The case where the third recess 2133 is arranged in the bottom wall of the second recess 2132 will be taken as an example for description below.

It should be understood that, in the embodiment of the present application, the first recess 2131 is arranged opposite to the second recess 2132. In other words, in the direction perpendicular to the pressure relief region, the positions of the first recess 2131 and the second recess 2132 are opposite. For example, with respect to the inner surface where the first recess 2131 of the battery box 21 is located, the projection of the second recess 2132 on the inner surface at least partially overlaps with the projection of the bottom wall of the first recess 2131 on the inner surface. For example, in the following description, the case where the first recess 2131 is arranged opposite to the second recess 2132 is taken as an example for description. That is, the axis perpendicular to the bottom wall of the first recess 2131 is the same as the axis perpendicular to the bottom wall of the second recess 2132.

The shapes of the bottom walls of the first recess 2131 and the second recess 2132 included in the pressure relief region 213 in the embodiment of the present application may be set according to the practical applications, and the shape of the bottom wall of the first recess 2131 and the shape of the bottom wall of the second recess 2132 may be the same or different. For ease of description, the case where the shape of the bottom wall of the first recess 2131 is the same as the shape of the bottom wall of the second recess 2132 is taken as an example for description blow. Here, the shape of the bottom wall of the first recess 2131 and the shape of the bottom wall of the second recess 2132 may be rectangular, circular, elliptical, or ring-shaped, which will be described in detail below in conjunction with two embodiments.

Optionally, as a first embodiment, as shown in FIGS. 8 and 9, the shape of the bottom wall of the first recess 2131 and the shape of the bottom wall of the second recess 2132 may be ring-shaped, for example, may be in the shape of a square ring, a circular ring or other ring-shapes. For example, the racetrack-shaped ring as shown in FIG. 5 is taken as an example here, wherein the racetrack shape is similar to an elliptical shape which is arc-shaped at both ends but is in the shape of a straight line in the middle, but the embodiments of the present application are not limited thereto.

As shown in FIG. 9, in order to facilitate machining, the arrangement of the third recess 2133 on the bottom wall of the second recess 2132 may include: the bottom wall of the second recess 2132 is provided with a fourth recess 2134, and the third recess 2133 is arranged on the bottom wall of the fourth recess 2134. Here, considering that the bottom wall of the second recess 2132 is ring-shaped, the shape of the bottom wall of the fourth recess 2134 may be consistent with the shape of the bottom wall of the second recess 2132 and is also set to be ring-shaped, but the embodiments of this application are not limited thereto.

As shown in FIG. 9, the cross-sectional shape as shown in FIG. 9 of the first recess 2131, the second recess 2132, the third recess 2133 and the fourth recess 2134 in the embodiment of the present application may be set according to the practical applications. For example, for the angle formed by the bottom wall and the side wall of the recess, the recess may be a right-angled recess shown as the second recess 2132 and the fourth recess 2134 shown in FIG. 9, or may be an inclined recess shown as the first recess 2131 and the third recess 2133 shown in FIG. 9, but the embodiments of the present application are not limited thereto.

As shown in FIG. 9, since the first recess 2131 and the second recess 2132 are ring recesses, there will be a protrusion structure in central region thereof. Here, the protrusion structure 2136 close to the interior of the housing 211 is taken as an example for description. The protrusion structure 2136 is the middle region of the ring-shaped first recess 2131, and the surface, close to the housing 211, of the protrusion structure 2136 may not protrude relative to the inner surface of the housing 211 except for the pressure relief region 213. For example, the surface, close to the housing 211, of the protrusion structure 2136 may be substantially flush with the inner surface of the housing 211 except for the pressure relief region 213, or as shown in FIG. 9, the surface, close to the housing 211, of the protrusion structure 2136 may also be concave relative to the inner surface of the housing 211 except for the pressure relief region 213, but the embodiments of the present application are not limited thereto.

Moreover, the outer periphery of the first recess 2131 does not protrude relative to the inner surface of the housing 211. As such, no protruding part will be provided on the inner surface of the housing 211, such that the electrode assembly and other components inside the housing 211 will not be affected during the installation thereof, and no additional design is needed for avoidance of the protruding part, thereby saving the internal space.

As shown in FIG. 9, for the exterior of the housing 211, the outer surface of the housing 211 may be provided with a protrusion 2137 surrounding the second recess 2132, and the protrusion 2137 extends in a direction away from the interior of the housing 211 relative to the outer surface of the housing 211. Considering that if the first recess 2131 and the second recess 2132 are machined by means of stamping, there will generally be a protrusion at the edge of the recess. If the protrusion is arranged in the interior, the installation of the internal electrode assembly will be affected. Therefore, the protrusion 2137 may be arranged on the outer surface of the housing 211.

Assuming that the battery cells 20 are assembled into the battery 10, it is necessary to provide a component below the battery cells 20, for example, a cooling plate may be provided to cool the battery cells 20, or a bottom protective plate may also be provided, but the embodiments of the present application are not limited thereto. Due to the presence of the protrusion 2137, for the components located below the battery cells 20, the battery cells 20 can be assembled by means of providing a recessed avoidance region on the surface. For example, if a cooling plate is provided below the battery cell 20, the cooling plate may be provided with a recess or a through hole in the region corresponding to the pressure relief region 213, such that the protruding protrusion 2137 in the pressure relief region 213 may be accommodated in the recess or the through hole, thereby saving the space.

In addition, due to the presence of the protrusion 2137, there is a gap between the surface of the pressure relief region 213 away from the interior of the housing 211 and the surface of the component (such as the cooling component or the bottom protective plate) located below the pressure relief region 213, so when the pressure relief region 213 discharges gas, a certain open space may be provided to ensure that the third recess 2133 of the pressure relief region 213 can fracture and be opened to relieve the internal pressure.

As shown in FIG. 9, in order to protect the side, away from the housing 211, of the pressure relief region 213 from being affected by the other components outside the battery box 21, the pressure relief region 213 may further include: a protective sheet 2135, which is used for protecting the pressure relief region 213, is arranged on the outer surface of the battery box 21, and covers the second recess 2132.

It should be understood that the dimensions of the above-mentioned portions in the embodiments of the present application may all be set according to the practical applications. For example, the description will be made below with reference to FIG. 9.

For the size of the pressure relief region 213, the area of the bottom wall of the first recess may be generally set to 400 $mm^2$ to 1000 $mm^2$, for example, may be set to 400 $mm^2$, 700 $mm^2$ or 1000 $mm^2$. The area of the bottom wall of the second recess 2132 may be generally set to 600 $mm^2$ to 1200 $mm^2$, for example, may be set to 600 $mm^2$, 900 $mm^2$ or 1200 $mm^2$. The area of the bottom wall of the fourth recess 2134 may be generally set to 200 $mm^2$ to 800 $mm^2$, for example, may be set to 200 $mm^2$, 500 $mm^2$ or 800 $mm^2$. Here, "$mm^2$" in the embodiments of the present application represents square millimeter.

As shown in FIG. 9, taking an example in which the pressure relief region 213 is arranged at the bottom wall of the housing 211, the thickness $h1$ of the bottom wall of the housing 211 may be generally set to 1.2 mm to 2 mm, for example, may be set to 1.2 mm, 1.5 mm or 2 mm; the depth $h2$ of the first recess 2131 relative to the inner surface of the battery box 21 may be generally set to 1 mm to 2 mm, for example, may be set to 1 mm, 1.5 mm or 2 mm; the depth $h3$ of the second recess 2132 relative to the outer surface of the battery box 21 is 0.3 mm to 0.6 mm, for example, may be set to 0.3 mm, 0.4 mm or 0.6 mm; the thickness $h4$ between the bottom wall of the second recess 2132 and the bottom wall of the first recess 2131 may be generally set to 0.3 mm to 1 mm, for example, may be set to 0.3 mm, 0.5 mm or 1 mm; and the thickness $h5$ of the pressure relief region 213 at the third recess 2133 may be generally set to 0.16 mm to 0.25 mm, for example, may be set to 0.16 mm, 0.2 mm or 0.25 mm. Here, in the embodiments of the present application, "mm" represents millimeter.

As shown in FIG. 9, with reference to the relevant dimensions of the first recess 2131 and the second recess 2132, such as the depth and the bottom wall area, the height $h6$ of the protrusion 2137 relative to the outer surface of the battery box 21 may be generally set to 0.5 mm to 1 mm, for example, may be set to 0.5 mm, 0.8 mm or 1 m. In addition, the thickness $h7$ of the protective sheet 2135 may be generally set to 0.1 mm to 0.2 mm, for example, may be set to 0.1 mm, 0.15 mm, or 0.2 mm.

Figure 10:
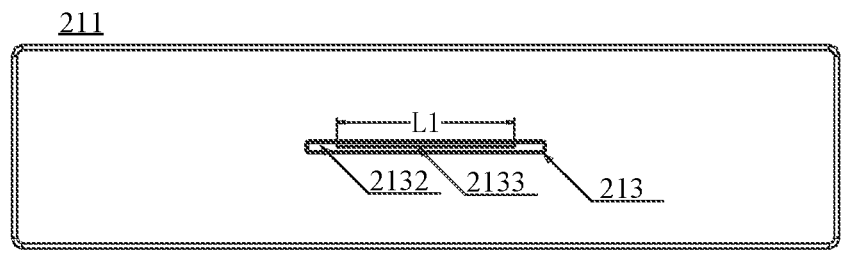
FIG. 10 is a bottom view of some embodiments of the housing of the battery box of the present application.

Optionally, as a second embodiment, the shape of the bottom wall of the first recess 2131 and the shape of the bottom wall of the second recess 2132 may also be set in other shapes, for example, may be set to be rectangular, circular, or racetrack-shaped. Here, taking the long-strip shape as an example, the long-strip shape is a special rectangle, that is, the length of the rectangle is much greater than the width. For example, still taking the example in which the pressure relief region 213 is located at the bottom wall of the housing 211, FIG. 10 is a bottom view of the housing 211, and as shown in FIG. 10, the second recess 2132 may be in a long-strip shape. Similarly, in the embodiment of the present application, the shape of the third recess 2133 may also be consistent with the first recess 2131 and the second recess 2132, and the long-strip shape is also taken as an example here.

Specifically, as shown in FIG. 10, the pressure relief region 213 is in a long-strip shape, that is, the length of the second recess 2132 of the pressure relief region 213 located at the outer surface of the bottom wall of the housing 211 is much greater than the width, and the length of the third recess 2133 is also much greater than the width. For example, taking the third recess 2133 as an example, the length L1 of the bottom wall of the third recess 2133 may be generally set to 40 mm to 100 mm, for example, may be set to 40 mm, 70 mm, or 100 mm. As such, the long-strip-shaped third recess 2133 has a larger length, and thus the open area is also larger, the gas discharge is smoother, the gas discharge rate is high, and it is not prone to explosion.

Figure 11:
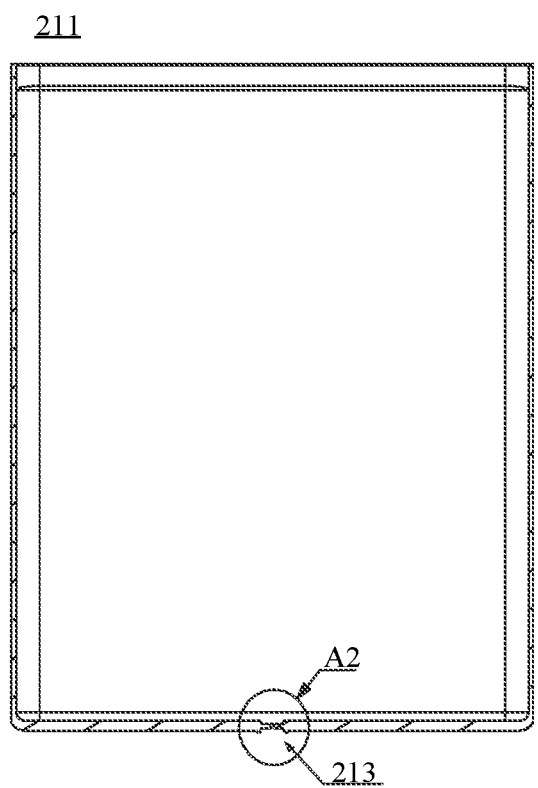
FIG. 11 is a cross-sectional view of some embodiments shown in FIG. 10.

FIG. 11 shows a cross-sectional view of the housing 211 in the embodiment of the present application. The upper part in FIG. 11 corresponds to the opening of the housing 211, the lower part in FIG. 11 is the bottom wall of the housing 211, and the bottom wall of the housing 211 is provided with a pressure relief region 213. FIG. 12 is an enlarged view of the region A2 in FIG. 11. The region A2 includes the pressure relief region 213, in which the upper part in FIG. 12 corresponds to the interior of the housing 211, and the lower part in FIG. 12 corresponds to the exterior of the housing 211. Specifically, as shown in FIG. 12, similar to FIG. 9, the inner surface of the housing 211 is provided with a first recess 2131, the outer surface of the housing 211 is provided with a second recess 2132, and the bottom wall of the second recess 2132 is provided with a third recess 2133. The difference from FIG. 9 is that the cross-sectional shape of the first recess 2131, the second recess 2132 and the third recess 2133 shown in FIG. 12 is no longer a ring shape with a protruding structure in the middle.

For the cross-sectional shape of the first recess 2131, the second recess 2132 and the third recess 2133 shown in FIG. 12 in the embodiment of the present application, a rounded trapezoid is taken as an example in FIG. 12, but other shapes may also be provided according to the practical applications. For example, the angle formed by the bottom wall and the side wall of each recess may be a right angle, that is, the first recess 2131, the second recess 2132 and the third recess 2133 may be right-angled recesses. Alternatively, considering that the bottom walls of the first recess 2131, the second recess 2132 and the third recess 2133 are all in a long-strip shape, it is difficult to machine them into right angle during the machining. Therefore, the first recess 2131, the second recess 2132 and the third recess 2133 may also be recesses with an inclined angle as shown in FIG. 12, such that the overall shape is trapezoidal, such as the rounded trapezoid in FIG. 12. That is, the areas of the bottom walls of the first recess 2131, the second recess 2132 and the third recess 2133 are smaller than the area of the opening, but the embodiments of the present application are not limited thereto.

As shown in FIG. 12, similar to FIG. 9, for the exterior of the housing 211, a protrusion 2137 may be provided on the outer surface of the housing 211 around the second recess 2132, and the protrusion 2137 extends in a direction away from the interior of the housing 211 relative to the outer surface of the housing 211. For brevity, they will not be described again here.

As shown in FIG. 12, in order to protect the side, away from the housing 211, of the pressure relief region 213 from being affected by the other components outside the battery box 21, similar to the first embodiment, the pressure relief region 213 may further include: a protective sheet 2135, which is used for protecting the pressure relief region 213, is arranged on the outer surface of the battery box 21, and covers the second recess 2132.

It should be understood that the dimensions of the above-mentioned portions in the embodiments of the present application may all be set according to the practical applications. For example, the description will be made below with reference to FIG. 12.

For the size of area of the pressure relief region 213, the area of the bottom wall of the second recess 2132 may be generally set to be equal to the area of the bottom wall of the first recess. For example, the area of the bottom wall of the first recess may be generally set to 150 mm$^2$ to 330 mm$^2$, for example, may be set to 150 mm$^2$, 200 mm$^2$ or 330 mm$^2$. The area of the bottom wall of the first recess 2132 may also generally be set to 150 mm$^2$ to 330 mm$^2$, for example, may be set to 150 mm$^2$, 200 mm$^2$ or 330 mm$^2$. In addition, the width of the bottom wall of the first recess 2131 may also be equal to the width of the bottom wall of the second recess 2132. For example, as shown in FIG. 12, the width L2 of the bottom wall of the first recess 2131 is equal to the width L2 of the bottom wall of the second recess 2132, and may be set to 3 mm to 6 mm, for example, may be set to 3 mm, 5 mm or 6 mm.

As shown in FIG. 12, taking an example in which the pressure relief region 213 is arranged at the bottom wall of the housing 211, the thickness h11 of the bottom wall of the housing 211 may be generally set to 1.2 mm to 2 mm, for example, may be set to 1.2 mm, 1.5 mm or 2 mm; the depth h12 of the first recess 2131 relative to the inner surface of the battery box 21 may be generally set to 0.4 mm to 0.7 mm, for example, may be set to 0.4 mm, 0.5 mm or 0.7 mm; the depth h13 of the second recess 2132 relative to the outer surface of the battery box 21 is 0.3 mm to 0.6 mm, for example, may be set to 0.3 mm, 0.5 mm or 0.6 mm; and the thickness h14 of the pressure relief region 213 at the third recess 2133 may be generally set to 0.16 mm to 0.25 mm, for example, may be set to 0.16 mm, 0.2 mm or 0.25 mm.

With reference to the relevant dimensions of the first recess 2131 and the second recess 2132, such as the depth and the bottom wall area, as shown in FIG. 12, the height h15 of the protrusion 2137 relative to the outer surface of the battery box 21 may be generally set to 0.25 mm to 0.5 mm, for example, may be set to 0.25 mm, 0.3 mm or 0.5 mm; and the thickness h16 of the protective sheet 2135 may be generally set to 0.1 mm to 0.2 mm, for example, may be set to 0.1 mm, 0.15 mm or 0.2 mm.

The battery box, the battery cell, and the battery according to the embodiments of the present application are described above with reference to FIGS. 1 to 12, and a method and apparatus for preparing a battery box according to the embodiments of the present application will be described below with reference to FIGS. 13 and 14.

Specifically, FIG. 13 shows a schematic flow chart of a method 200 for preparing a battery box according to the embodiments of the present application. As shown in FIG. 13, the method 200 may include: S210, providing a first recess in an inner surface of the battery box, and providing a second recess in an outer surface of the battery box, so as to form a pressure relief region of the battery box, wherein the first recess is arranged opposite to the second recess; and S220, providing a third recess in a bottom wall of the first recess and/or in a bottom wall of the second recess, the pressure relief region being configured to fracture at the third recess, when the internal pressure of the battery box reaches the threshold, to relieve the internal pressure.

Optionally, in some embodiments, a protrusion is provided on the outer surface of the battery box and surrounds the second recess.

Optionally, as an embodiment, the shape of the bottom wall of the first recess and/or the bottom wall of the third recess is a long-strip shape.

Optionally, as an example, the first recess and/or the second recess are/is a ring recess.

It should be understood that the method 200 of the embodiment of the present application may be used for preparing the battery box 21 of the embodiments of the present application, which will not be described here again for brevity.

It should be understood that, in various embodiments of the present application, the size of the sequence number of the foregoing processes does not mean the order of execution, and the order of execution of the processes should be determined by its function and internal logic, and should not constitute any limitation to the implementation process of the embodiments of the present application.

FIG. 14 shows a schematic block diagram of an apparatus 300 for preparing a battery box of the embodiments of the present application. As shown in FIG. 14, the apparatus 300 according to the embodiment of the present application includes: an arrangement module 310, the arrangement module 310 is configured to: provide a first recess in an inner surface of the battery box, and provide a second recess in an outer surface of the battery box, so as to form a pressure relief region of the battery box, wherein the first recess is arranged opposite to the second recess; and provide a third recess in a bottom wall of the first recess and/or in a bottom wall of the second recess, the pressure relief region being configured to fracture at the third recess, when the internal pressure of the battery box reaches the threshold, to relieve the internal pressure.

Optionally, in some embodiments, a protrusion is provided on the outer surface of the battery box and surrounds the second recess.

Optionally, as an embodiment, the shape of the bottom wall of the first recess and/or the bottom wall of the third recess is a long-strip shape.

Optionally, as an example, the first recess and/or the second recess are/is a ring recess.

It should be understood that the apparatus 300 according to the embodiments of the present application may correspond to the execution of the method 200 in the embodiments of the present application, and that the foregoing and other operations and/or functions of the units in the apparatus 300 are respectively intended to implement the corresponding process of the method 200 in FIG. 13, which will not be described again here for brevity.

Finally, it should be noted that the above embodiments are merely used for illustrating rather than limiting the technical solution of the present application; although the present application is illustrated in detail with reference to the foregoing embodiments, those of ordinary skill in the art should understand that it is still possible to make modifications to the technical solutions described in the foregoing embodiments or to make equivalent substitutions to some of the technical features thereof, but these modifications or substitutions can be made to the respective technical solutions without departing from the spirit and scope of the technical solutions of the embodiments of the present application.

What is claimed is:

1. A battery box, comprising a pressure relief region, the pressure relief region comprising a first recess arranged at an inner surface of the battery box and a second recess arranged at an outer surface of the battery box, the first recess being arranged opposite to the second recess, wherein a third recess is provided at a bottom wall of the second recess, and the pressure relief region is configured to fracture at the third recess, when an internal pressure of the battery box reaches a threshold, to relieve the internal pressure;

wherein the first recess and/or the second recess are/is a ring recess,
the bottom wall of the second recess is provided with a ring-shaped fourth recess, and the third recess is arranged at a bottom wall of the fourth recess.

2. The battery box according to claim 1, wherein a thickness of the pressure relief region at the third recess is 0.16 mm to 0.25 mm.

3. The battery box according to claim 1, wherein an axis perpendicular to the bottom wall of the first recess is the same as an axis perpendicular to the bottom wall of the second recess.

4. The battery box according to claim 1, wherein a protrusion is provided on the outer surface of the battery box and surrounds the second recess.

5. The battery box according to claim 4, wherein a height of the protrusion relative to the outer surface of the battery box is 0.25 mm to 1 mm.

6. The battery box according to claim 1, wherein a shape of the bottom wall of the first recess and/or the bottom wall of the second recess is a long-strip shape.

7. The battery box according to claim 6, wherein a width of the bottom wall of the first recess and/or the bottom wall of the second recess is 3 mm to 6 mm;
an area of the bottom wall of the first recess is 150 mm$^2$ to 330 mm$^2$; and/or an area of the bottom wall of the second recess is 150 mm$^2$ to 330 mm$^2$;
a depth of the first recess relative to the inner surface of the battery box is 0.4 mm to 0.7 mm; and/or a depth of the second recess relative to the outer surface of the battery box is 0.3 mm to 0.6 mm.

8. The battery box according to claim 7, wherein a shape of the bottom wall of the third recess is a long-strip shape.

9. The battery box according to claim 1, wherein an area of the bottom wall of the first recess is 400 mm$^2$ to 1000 mm$^2$; and/or an area of the bottom wall of the second recess is 600 mm$^2$ to 1200 mm$^2$;
a depth of the first recess relative to the inner surface of the battery box is 1 mm to 2 mm; and/or a depth of the second recess relative to the outer surface of the battery box is 0.3 mm to 0.6 mm.

10. The battery box according to claim 1, wherein an area of the bottom wall of the fourth recess is 200 mm$^2$ to 800 mm$^2$.

11. The battery box according to claim 1, further comprising:
a protective sheet, which is configured to protect the pressure relief region, and is arranged on the outer surface of the battery box, and covers the second recess.

12. The battery box according to claim 11, wherein a thickness of the protective sheet is 0.1 mm to 0.2 mm.

13. The battery box according to claim 1, comprising:
a housing being a hollow cuboid and having an opening at one end; and
a cover plate covering the opening of the housing.

14. The battery box according to claim 13, wherein the pressure relief region is located at a bottom wall of the housing, and the bottom wall of the housing is a wall opposite the opening of the housing.

15. A battery cell, comprising:
the battery box according to claim 1; and
an electrode assembly being arranged in the battery box.

16. The battery cell according to claim 15, wherein the battery box comprises:
a housing being a hollow cuboid and having an opening at one end; and a cover plate covering the opening of the housing; and
the battery cell further comprises:
a backing plate being located between the electrode assembly and a bottom wall of the housing, and the bottom wall of the housing being a wall of the housing opposite the opening of the housing.

17. The battery cell according to claim 16, wherein the pressure relief region is located at the bottom wall of the housing, and the backing plate is provided with a through hole corresponding to the pressure relief region such that the backing plate does not block the pressure relief region.

18. A battery, comprising:
a plurality of battery cells including at least one battery cell according of claim 15;
a bus component configured to achieve electrical connection of the plurality of battery cells; and
a case configured to accommodate the plurality of battery cells and the bus component.

\* \* \* \* \*